E. WHITMAN.
FLOWER POT.
No. 82,052. Patented Sept. 8, 1868.
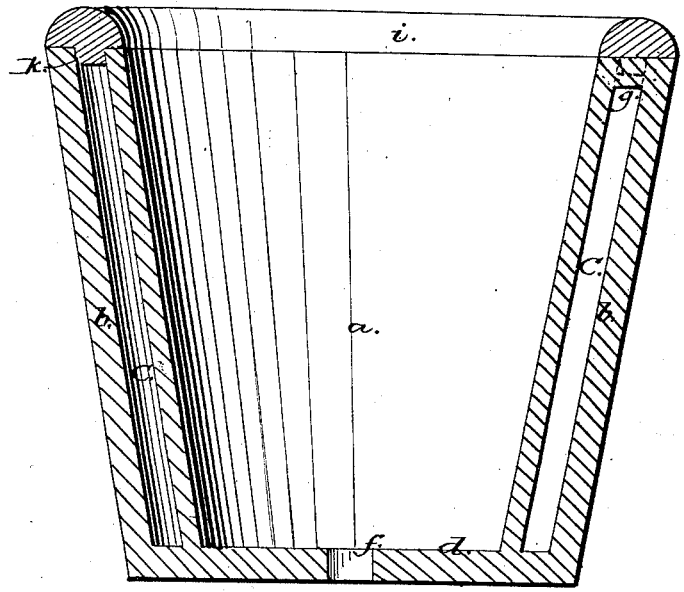
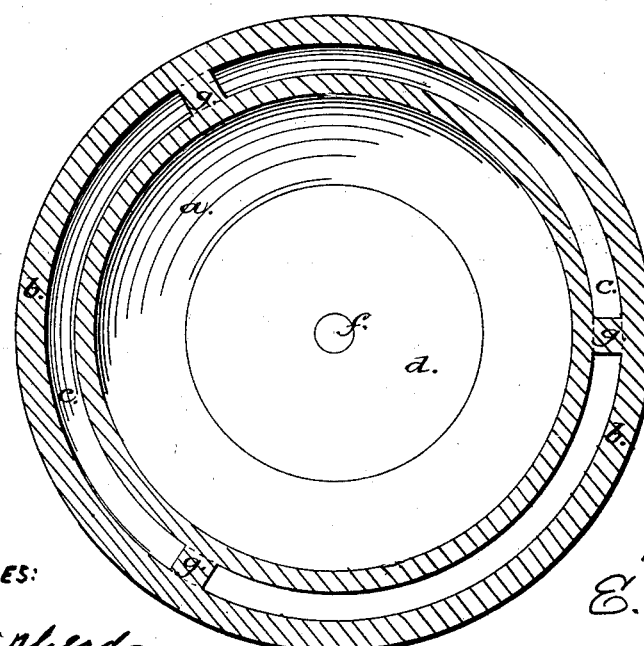
WITNESSES:
INVENTOR:

United States Patent Office.

EPHRAIM WHITMAN, OF FITCHBURG, MASSACHUSETTS.

*Letters Patent No. 82,052, dated September 8, 1868.*

---

IMPROVEMENT IN FLOWER-POT.

---

*The Schedule referred to in these Letters Patent and making part of the same.*

---

TO ALL WHOM IT MAY CONCERN:

Be it known that I, EPHRAIM WHITMAN, of Fitchburg, in the county of Worcester, and State of Massachusetts, have invented an Improved Flower-Pot; and I do hereby declare that the following, taken in connection with the drawings which accompany and form part of this specification, is a description of my invention sufficient to enable those skilled in the art to practise it.

Ordinarily, earthenware pots for cultivating plants are well known, the most common article being made of unglazed, porous, pottery-clay, frusto-conical in form, open at top, and closed at bottom, with the exception of a small hole left for drainage.

This pottery is a rapid conductor of heat and moisture, and many plants potted therein cannot be safely exposed to sun and air, and in all earthenware pots, plants suffer more or less from excess of water, if poured directly upon the pot-contained earth.

My invention has reference to the construction of a flower-pot, with a surrounding and wall-enclosed narrow chamber, which operates, not only as a non-conducting air-space, but as a fluid-reservoir, for receiving the plant-feeding water, the inner and outer walls being connected and relatively fixed.

The drawings represent a central section and a plan of my improved flower-pot.

$a$ denotes the plant-containing vessel, which may be made in form not unlike the common flower-pot, and which may be formed of the common flower-pot clay.

This vessel is placed within another and larger vessel, $b$, which is separated from the vessel $a$ by an intervening space, $c$.

The pot is shown as having a bottom, $d$, common to both vessels, this bottom having through its centre, if desirable, a drainage-hole, $f$.

Connecting the two vessels $a\ b$ together, are ties or bridges $g$, which prevent any movement of either vessel relatively to the other, these pieces $g$ being preferably formed of the same clay as are the vessels or walls $a\ b$, and being placed in position while the whole material is in a plastic condition, so that the walls and ties are integral.

The pot being thus made, it will readily be seen that the roots of a plant growing in earth placed in the pot $a$ are always protected from direct action of sun and air striking upon the outer surface of the pot, and that the intervening space $c$ constitutes a water-receiving and containing reservoir, through which water will only percolate in sufficient quantity for the proper requirements of the plant.

The vessel or wall $b$ may be glazed upon its outer surface, but the inner vessel $a$ must be porous.

The chamber $c$ may be surrounded by a cap-ring, $i$, loosely fitting upon the pot, and held in place by a lip, $k$, or short projection, extending down slightly into the chamber, this cap being useful, especially in potting a plant, to keep the earth from falling into the chamber, and for giving a finished upper edge to the pot.

The form and size of the pot, the thickness of walls, and the breadth of the chamber $c$, may all of course be varied, according to the nature of the plants to be potted, or the degree of ornamentation desired.

With small flower-pots, the ties $g$ may be dispensed with, as the union of the outer to the inner pot, at the bottom, will be sufficient to maintain the two in relative position; but with large pots, I prefer to add the ties.

I claim, as a new article of manufacture—

A flower-pot, made with inner and outer walls, $a\ b$, and an intervening water-space $c$, the walls $a\ b$ being connected or relatively fixed in position, substantially as shown and described.

I also claim, in combination with the water-chamber $c$, the cap-ring $i$, substantially as shown and described.

EPHRAIM WHITMAN.

Witnesses:
AUGUSTINE S. WHITMAN,
HERBERT W. WYMAN.